United States Patent

Brotz

[11] Patent Number: 5,437,820
[45] Date of Patent: Aug. 1, 1995

[54] PROCESS FOR MANUFACTURING A THREE-DIMENSIONAL SHAPED PRODUCT

[76] Inventor: Gregory R. Brotz, P.O. Box 1322, Sheboygan, Wis. 53081

[21] Appl. No.: 166,511

[22] Filed: Dec. 13, 1993

Related U.S. Application Data

[63] Continuation-in-part of Ser. No. 834,386, Feb. 12, 1992, Pat. No. 5,269,982.

[51] Int. Cl.$^6$ .......... B29C 35/08; B29C 35/10
[52] U.S. Cl. .......... 264/25; 264/69; 264/125; 264/126; 264/308
[58] Field of Search .......... 264/22, 25, 69, 125, 264/126, 127, 308

[56] References Cited

U.S. PATENT DOCUMENTS

| | | | |
|---|---|---|---|
| 5,147,587 | 9/1992 | Marcus et al. | 264/22 |
| 5,156,697 | 10/1992 | Bourell et al. | 264/125 |
| 5,304,329 | 4/1994 | Dickens, Jr. et al. | 264/25 |

Primary Examiner—Mary Lynn Theisen
Attorney, Agent, or Firm—William Nitkin

[57] ABSTRACT

A process for creating a three-dimensional shaped object by providing a container having a fluidized bed of fusable particles therein and a base plate disposed within the particle bed below an upper level of the particles. A heat beam is directed in a desired pattern onto the upper level of particles above the base plate to fuse certain of the particles together to form a formed shape with the base plate then being lowered. A new upper level of fusable particles from the particle bed covers the formed shape, selected of which particles are then heated by the heat beam in a desired pattern to fuse the thus-heated particles to one another and to fuse the particles to the previously fused formed shape of particles with the process continuing until the desired three-dimensional shaped product is formed and removed from the particle bed.

19 Claims, 3 Drawing Sheets

PROCESS FOR MANUFACTURING A THREE-DIMENSIONAL SHAPED PRODUCT

This application is a continuation-in-part of my previous application for Process for Manufacturing a Shaped Product filed Feb. 12, 1992, Ser. No. 07/834,386, now U.S. Pat. No. 5,269,982.

BACKGROUND OF THE INVENTION

1. Field of the Invention

The process of this invention resides in the area of processes for producing a three-dimensional shaped product and more particularly relates to a process for producing such a product by fusing a plurality of particles together in multi layers to form such three-dimensional solid walled member in a desired shape.

2. Description of the Prior Art

Processes for producing molded products are well known such as coiled clay method, casting including lost wax-type methods, injection cast molding, blow molding, vacuum molding and the like. Also sintering has been used to form coherent, non-porous, bonded masses by heating metal powders without melting them to form shapes. Further processes have used liquids which, upon stimulation of laser light, solidify where such light has contacted them. These types of processes include the use of liquid monomers that polymerize when exposed to laser frequency light and the use of two-component liquid systems which co-react with one another in areas where stuck by a laser beam. These types of photocuring processes, however, yield only structures with low strength, and currently the objects so created are primarily used as models.

SUMMARY OF THE INVENTION

It is an object of this invention to provide a new process for the production of a three-dimensional shaped product of high strength which process does not utilize traditional molds as found in the prior art. The multi-step process of this invention creates a three-dimensional shaped product by the scanning of a heat beam in a desired pattern, such as from a laser, onto an upper layer of a plurality of fusable particles positioned directly above a base plate. The particles struck by the heat beam are heated, melted and fused together into a formed shape while those not struck or affected by the heat beam are not so fused and remain separate from the fused particles. The fused particles, when cooled, solidify into the shape of the area struck by the heat beam. The base plate on which the formed shape rests is then lowered, and a new upper level of particles moves over from a particle bed to be above the formed shape. The heat beam then repeatedly strikes upper layers of particles that form over the fused particles as the base plate is lowered, not only to fuse selected of the particles of each new upper layer to one another but also to fuse them to the previously fused formed shape so as to form a three-dimensional shaped object.

In one embodiment of the process of this invention, a container having a depth can be utilized containing the plurality of fusable particles. The particles act as a fluid, that is, they will flow around an object if the object is moved therethrough. The particles can be maintained in a fluidized bed as described below. The particles can be made of a solid polymer of high strength, of various metals, glass, ceramic, reclaimed scrap, a mixture of two types of particulate materials which blend as they are melted, or can be made of other equivalent materials which, when heated sufficiently, will melt and fuse together to form a strong, three-dimensional shaped product. The particles can be provided in a variety of shapes such as spheres, beads and the like.

Means can be provided to add more particles to the container as three-dimensional shaped products are formed therein and the fused particles are removed, used or fused from the particle bed so as to keep a proper level of particles available for repetitive formation of three-dimensional shaped products from such particle bed. Articles can be formed having hollow interiors; and loose, unfused particles in the interior of such article may have to be removed or added to keep the upper surface level of the particles at the proper height as the article is being formed. Such hollow articles may have loose particles therein after formation which can be shaken out after completion of the article.

The heat beam directed on the particles can be produced by a laser beam or by other means which will produce a heat beam of sufficient temperature and intensity that when directed in a desired pattern on the uppermost layer of the plurality of particles disposed above a base plate or the previously fused shape, such heated beam will strike the upper layer of particles and the particles so struck will melt and fuse together. Also, in another embodiment, the moving heat beam can be produced from a high-intensity light with a fixed-focus optical system which moves horizontally over the surface of the particle bed on an X-Y axis directed by a plotter-type system. The focal length of the heat beam remains the same in such systems as the distance between the heat source and the surface of the particle bed is always the same. When the heat beam passes away from or ceases heating the particles to a molten and fused state, the fused particles then will cool and solidify into a formed layer. As the next layer of particles is caused to flow over the fused particles by the lowering of the base plate into the bed as will be described below, the heat beam can then be directed on the next layer of particles which will be fused together and also fused to the already fused and solidified formed layer therebelow, thus forming layer upon layer, if done in a repetitive fashion, to create a three-dimensional object from the fused particles which object can be removed from the top of the base plate and from the particle bed when completed. Any shape, including shapes with intricate interior chambers, can be created by the direction of the heat beam, for example, by a mirror to aim the heat beam on a particular area, such mirror's scanning direction being controlled by a computer having a scanning program so that an infinite variety of three-dimensional objects can be created depending upon the aiming of the heat beam onto the layer of particles above the base plate or above a previous layer or layers of fused particles above the base plate. In a further embodiment of this invention, continuous length structures can be made which are pulled, as they are being formed, out of the bottom of the particle container through an exit port.

DESCRIPTION OF THE PREFERRED EMBODIMENT(S)

Figure 1:
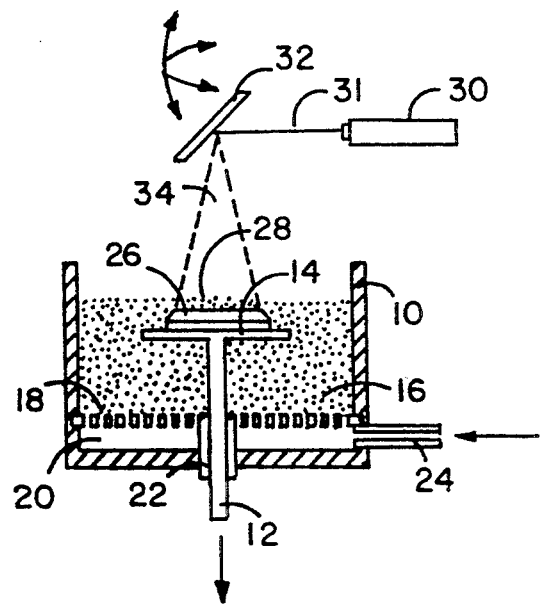
FIG. 1 illustrates a side cross-sectional view of a container having a base plate positioned within a particle bed containing a plurality of fusable particles above which container is disposed means to direct a heat beam from a laser onto the upper level of fusable particles to fuse selected of said particles into a desired formed shape.

FIG. 1 illustrates the basic structure of this invention wherein container 10 holds a plurality of fusable particles forming a fluidized particle bed 16 having an upper level 28 of particles which is disposed in a generally level, horizontal plane. Although not illustrated in this view, it should be appreciated that a particle supply source can automatically provide further particles to the particle bed in container 10 by well-known means as the particles are fused during the process of this invention. Within particle bed 16 is positioned horizontally disposed base plate 14 which is mounted on vertically disposed shaft 12 which is movable within sleeve 22. At the start of the process of this invention base plate 14 initially starts in its uppermost position such that laser 30 can direct a heat beam 31 to mirror 32 which is moved by a motor, not seen in this view, directed by a scanning computer or equivalent means operating a scanning program in a particular desired pattern such that the heat beam is scanned within the area circumscribed by lines 34 over the upper level of particles which are located above base plate 14, thereby melting and fusing such heat beam-struck particles to form a formed shape 26 having a length, width and height. In one embodiment the fluidized particle bed 16 can be kept in a heated state at a temperature below the melting point of the particles by entering heated air through heat inlet 24 and passing such heated air into heat chamber 20 where the heated air will pass into the particle bed through heat inlet openings 18. By controlling the temperature of the fluidized particle bed, the process of further heating the particles to their melting point by the heat beam is faster and easier to accomplish because the particles' temperature need only be raised a smaller amount rather than a greater amount if the particles are, for example, at room temperature. This feature is especially important when the particulate matter is crystalline or has a sharply defined melting temperature.

The frequency wavelength of the laser beam is desired to lie within the maximum part of the absorption spectrum of the particles utilized. Thus the fusable particles' thermal absorption properties must be studied before it is determined which laser should be utilized to best melt and fuse such particles. There are many high-intensity lasers that can be used such as $CO_2$ CW laser, $CO_2$ lasers for cutting, welding and scribing systems, $CO_2$ lasers having variable frequency, electronic-related laser systems using $CO_2$, XeYAG, NdYAG CW-Q-switched soldering machine systems and pulsed, industrial lasers. In some instances it may be desirable during the scanning process to modulate the laser on and off for various effects. Also it may be necessary when utilizing some types of particles for adjacent scans of such fusable particles to overlap one another by part of the width of the scan to fuse the particles to each other.

Figure 2:
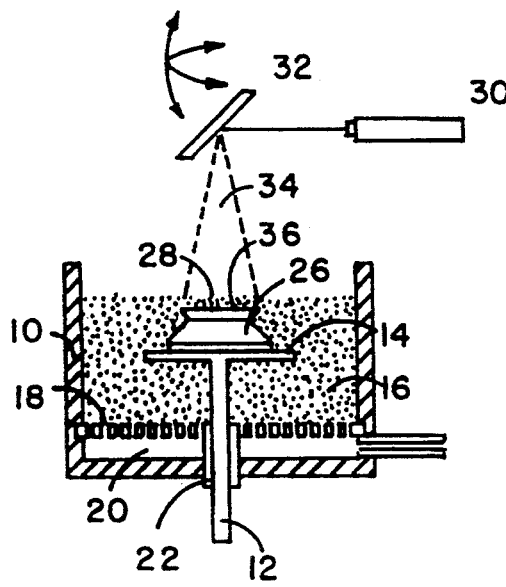
FIG. 2 illustrates a side cross-sectional view showing the base plate of FIG. 1 now in a lowered position within the particle bed with the heat beam fusing selected particles to one another and to the already fused formed shape therebelow to form layers of fused particles to create a three-dimensional shaped product by the process of this invention.

FIG. 2 illustrates the continuous process nature of this invention where base plate 14 has been lowered within particle bed 16 by the lowering of shaft 12 within sleeve 22, thereby causing an upper level of particles to flow on top of formed shape 26 such that those additional particles, being new particles 28, are then melted and fused in a desired shape to form a new layer 36 of the formed shape, the particles of which are not only fused together but also at the same time are fused to the original fused formed shape 26. As base plate 14 continues to be lowered within container 10, more particles in particle bed 16 will flow over the most recently fused formed shape of the three-dimensional shaped product being formed to be then fused by a movement of mirror 32 directing heat beam 34 in a desired pattern thereover to continuously create a three-dimensional object until such object's creation is completed. In another method of operation, the base plate can be stopped as each layer of particles is fused as a scanning sequence is completed. The base plate is then lowered to the next cross-section formation level, and the next heat scan is completed with the process continuing. It can be helpful to vibrate the particle bed to facilitate the flowing of particles across the top of the formed shaped product's fused upper surface in the continuous scanning and step-scanning methods. A focused acoustical wave can also be used to facilitate the movement of the particles over the upper surface of the top layer of the formed shape. The three-dimensional shaped product is then removed from the top of base plate 14 and from particle bed 16 in container 10 after completion. The process is then restarted with base plate 14 on shaft 12 moved up to the top of the container just below an upper level of particles in particle bed 16 where after more particles have been entered into the container, the entire scanning process will start again to create the same three-dimensional shaped product or a different shaped product as desired. More than one object, either the same or different, can be made at the same time on the base plate in one run.

As mentioned above it is an object of this invention to form solid or hollow, hard structures. To this end plastic polymers of high strength can be used to form the particles. Metal particles can be used if brought close to their melting temperature by heating the particle bed provided within container 10.

Figure 3:
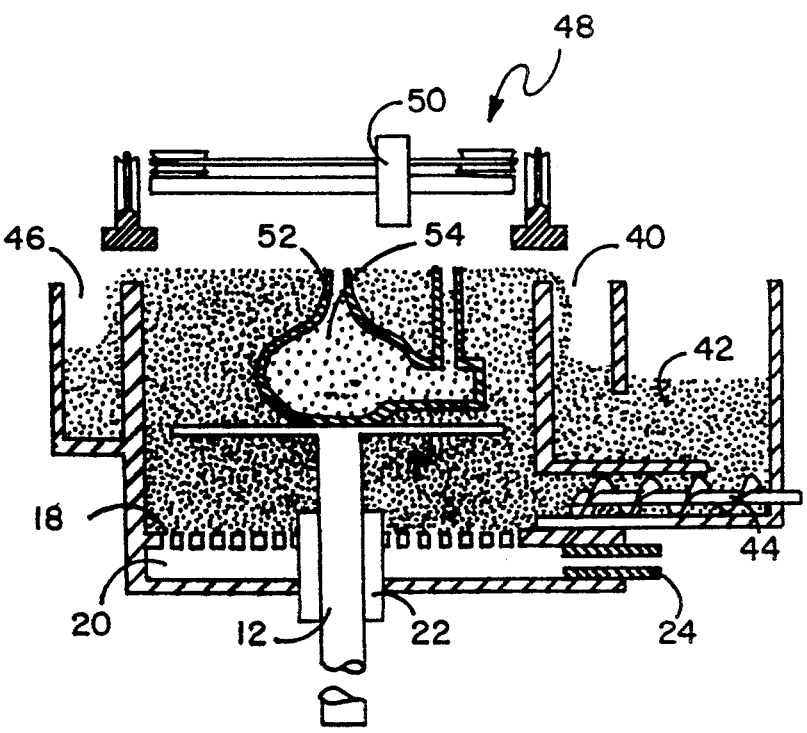
FIG. 3 illustrates a side cross-sectional view of a hollow, three-dimensional shaped object being formed by the action of a moving heat beam.
Figure 4:
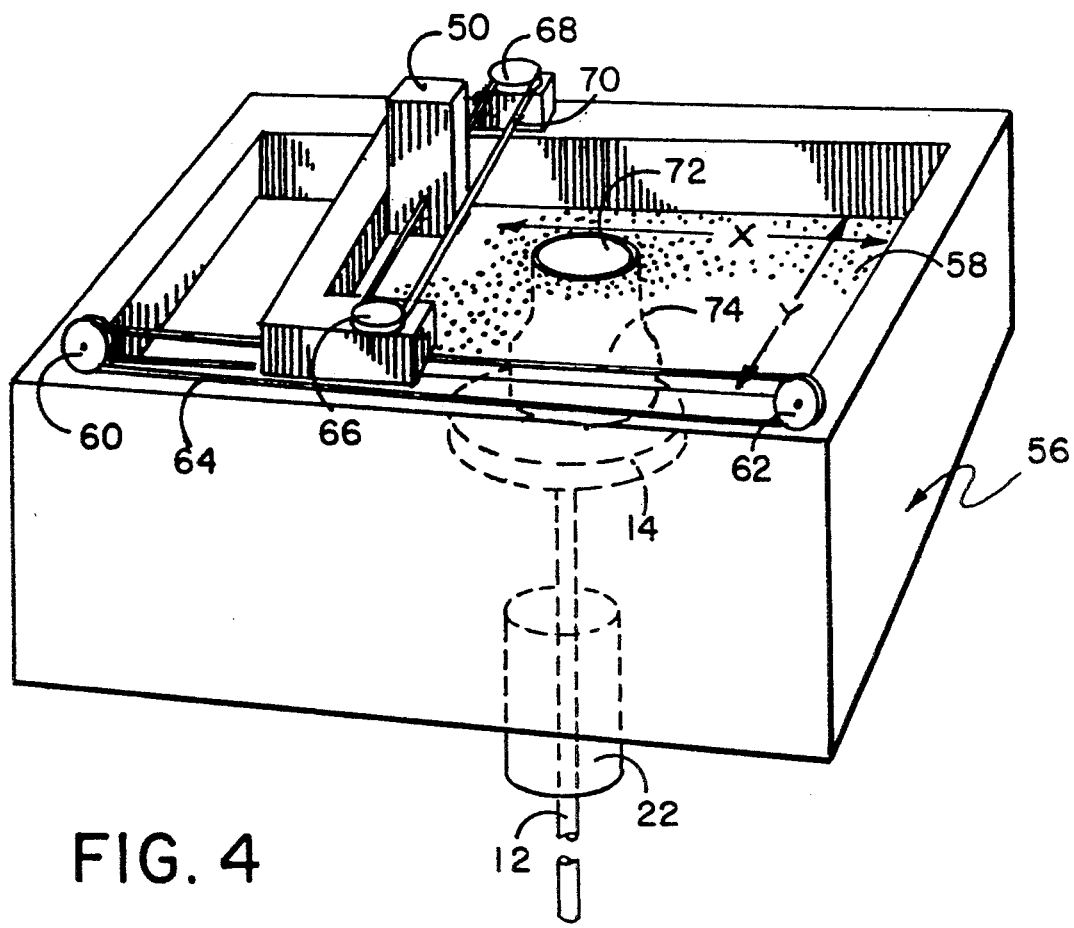
FIG. 4 illustrates a perspective view of a moving heat beam source, forming a three-dimensional shaped object in the particle bed.
Figure 6:
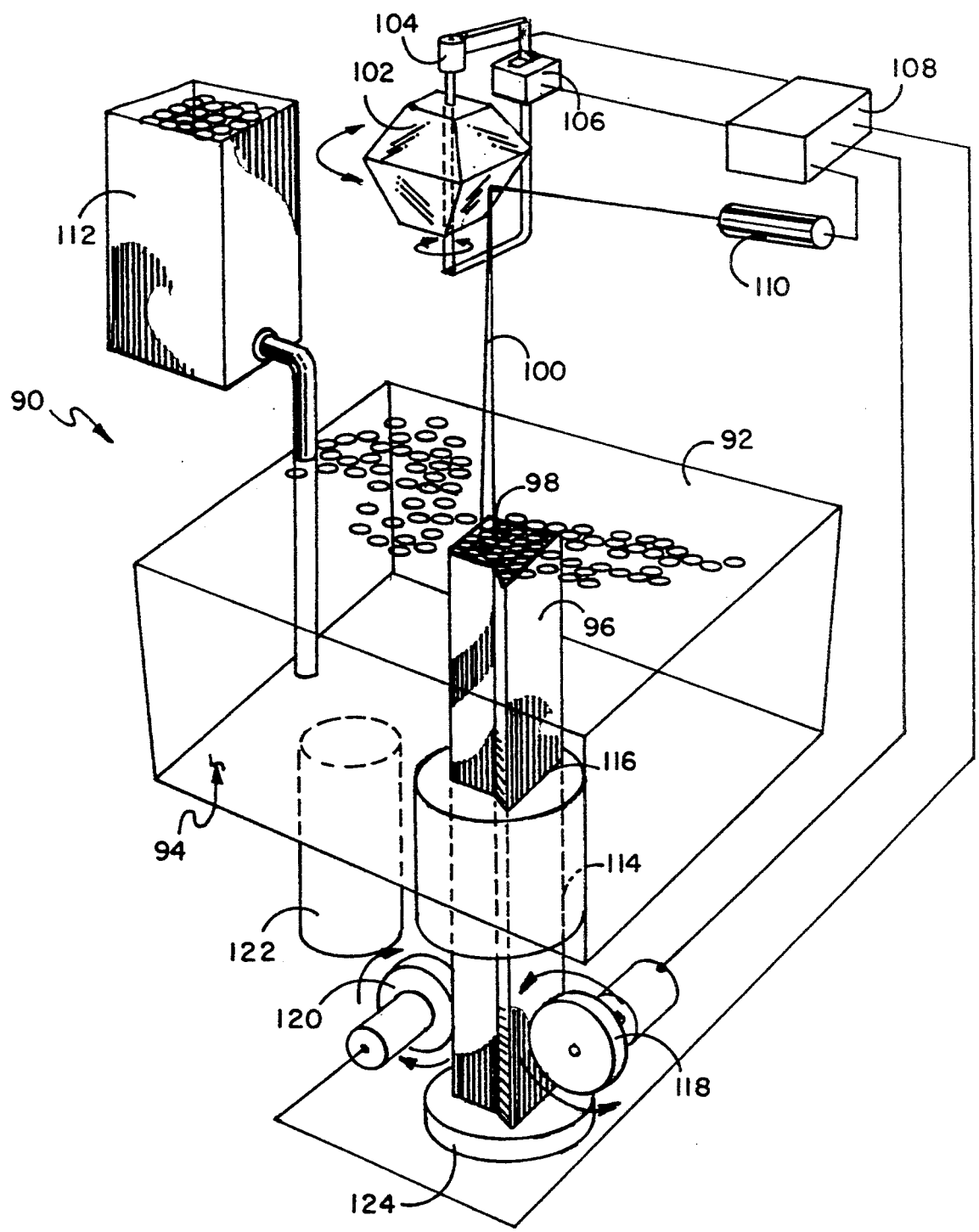
FIG. 6 illustrates a perspective view of an elongated, continuous-length three-dimensional object being formed from the particle bed by the process of this invention.

FIG. 3 illustrates a side perspective view of a heat beam utilized with a scanner from a plotting-type structure 48 to create a hollow, shaped structure 52. As seen in this view, the heat beam is produced from a fixed-focus light source 50, as described further below, and is moved over the upper surface of the particle bed by a plotting mechanism, as more clearly seen in FIG. 4. In FIG. 4 the fixed-focus heat beam device 50 is moved on a carriage that is driven along the X-axis on belt 64 on wheels 60 and 62 such that the carriage traverses the bed back and forth as desired by a small electric motor which is controlled by computer 108, such as seen in FIG. 6. As seen in FIG. 4 fixed-focus heat beam device 50 is driven along the Y-axis on belt 70 by wheels 66 and 68 also by a small computer-controlled motor. This mechanism for moving the fixed-focus heat beam device 50 is well known in the art of plotters for moving an object in an X-Y axis such that the heat beam scanner is moved back and forth over the upper surface of the particle bed.

Figure 5:
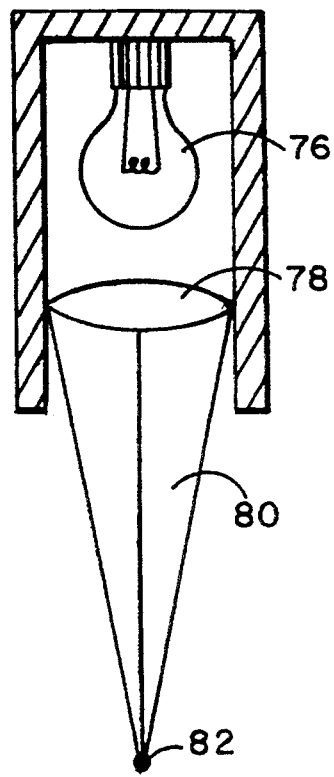
FIG. 5 illustrates a side cross-sectional view of a fixed-focus heat beam source.

FIG. 5 illustrates a cross-sectional view of the interior of a fixed-focus heat beam which has a light 76 producing a hot, high-intensity beam that is focused through a lens 78 with the heat beam 80 produced being focused at a focal point 82 which can be designed to be directly on the upper layer of the particles being melted and fused.

In FIG. 3 one can see hollow object 52 being formed. The level of the particle bed is maintained by having the beads spill over into overflow channels 40 and 46. Overflow channel 40 on one side can have the particles pass into an overflow return chamber 42 wherein an auger 44 drives the unused particles back into the particle bed. The particles are then heated to form a heated, fluidized bed, as described above, and the shaped hollow object is formed as the heat beam passes thereover, striking the particles where desired. Intricate structures can be formed including hollow structures which may have beads contained therein as they are formed which particles would have to be emptied out from the structure at a later time.

FIG. 6 illustrates another embodiment of the process of this invention wherein particle bed 92 is seen held within container 94, as described above, with further particles from hopper 112 being added as the particles are used to form the object. Object 96 is a continuous-length object which is pulled from the bottom of container 94 as it is being formed. Laser 110 strikes mirror 102 which, as illustrated here, can be a polygonal, multisurfaced mirror which can both rotate by motor 104 and tilt to cause a selected surface of mirror 102 to be struck by the heat beam, such tilting controlled by actuator 106 which can be a solenoid-type device to tilt the mirror in the desired direction. In this way no particular mirror surface is struck for too long a period of time by the high-intensity laser beam which might otherwise damage such mirror surface. Metal mirrors also can be utilized. Computer 108 controls the movement of mirror 102 and its ultimate direction of heat beam 100 onto the upper surface 98 of the continuous-length structure 96 being formed. The bed can be vibrated by vibrator 122 which vibrator can be used in any of the embodiments of this invention to help cause the particles to flow back over the upper surface of the object being formed. Vibrator 122 in one embodiment can be an acoustical energy source focused from the top onto the upper layer of particles. A collar 114 is provided in the base of container 94 with an opening 116 therein of the approximate shape of the continuous-length object being formed. Once the object has passed through collar 116, further additions of fused particles can be made onto the top of the object by the heat beam fusing the particles together. The continuous-length structure 96 being formed can be pulled out of the particle bed by wheels 118 and 120 driven by motor controlled by computer 108 so as to be in sequence with the melting and fusing of the upper particle layer on the top of structure 96.

It should be noted that in all the embodiments of this invention the addition or removal of particles has to be done as needed to maintain the particles at a level just over the upper surface of the object being formed. The fusion of the particles onto the object as it is lowered into the particle bed can reduce the total volume or particle level of the container. There are certain instances relating to the size of the object being formed where as it is lowered into the particle bed below it, the particle surface would be caused to rise too fast such as in the case where a bowl-shaped object is being formed and the interior of the bowl is not entirely filled with loose particles. The empty volume of the bowl as it is being lowered will cause the particles level to rise faster than desired. Therefore at such a time particles would need to be removed from the particle bed. In the embodiment such as seen in FIG. 3 particles would constantly overflow the side walls of the container into the overflow channels for recirculation back into the particle bed.

It should be noted for some particles the pre-heating step in the particle bed may be unnecessary such as for particles that melt quickly at a low temperature. Further the surface tension over the fusing area can also be utilized to advantage. Some molten metals will automatically flow and bond to the smooth, previously cooled lower level rather than flowing off into the interstices of nearby loose particles. In some cases if particles are stuck to the finished product, a sandblasting or equivalent process including scraping can help remove these undesired, adhered particles. Also, for some objects it may be desirable for the particulate material to adhere to its surface so that it can be programmed into the scanner for the scanner to periodically laterally scan the object to make such particles adhere to the object being formed with such adhered particles not fully melted or absorbed into the object's exterior surface. In some structures the base plate can move up again during the processing.

Although the present invention has been described with reference to particular embodiments, it will be apparent to those skilled in the art that variations and modifications can be substituted therefor without departing from the principles and spirit of the invention.

I claim:

1. A process for producing a three-dimensional shaped product comprising the steps of:
   providing a container having a top, a bottom and sides;
   providing a fluidized particle bed in said container made of a plurality of fusable particles, each particle in contact with its immediately adjacent particles in said particle bed, said particle bed having an upper layer of particles;
   providing a base plate having a top that is vertically movable within said particle bed, said base plate positioned immediately below said upper layer of particles;
   providing a heat beam;
   directing said heat beam in a desired pattern onto said upper layer of particles above said base plate;
   melting and fusing together those particles heated by said heat beam;
   allowing said fused particles to solidify into a shape formed in said desired pattern;
   lowering said base plate to a position under said upper layer of said particle bed;
   covering said formed shape by further of said particles moving over said fused particles;
   directing said heat beam in a desired pattern onto said particles covering said previously fused formed shape, said heat beam fusing certain of said particles together with one another and with said fused particles of said formed shape;

allowing said newly fused shape to solidify on top of said previously fused particles;

repeating said steps of lowering said base plate and causing further particles to cover said previously fused particles, directing said heat beam in a desired pattern, and allowing said fused particles to solidify as many times as necessary to complete the formation of said three-dimensional shaped product; and removing said three-dimensional shaped product from said particle bed.

2. The method of claim 1 further including the step of heating said particles in said particle bed to a temperature lower than the melting point of said particles.

3. The method of claim 1 further including the step of:

maintaining the level of particles at a desired height within said container.

4. The method of claim 1 further including means to vibrate said particles within said container to aid in their movement over said three-dimensional object being formed.

5. The method of claim 1 wherein said heat beam is a laser and the step of directing said heat beam includes the steps of providing a moving mirror controlled by a computer and reflecting said laser beam onto said upper layer of particles.

6. The method of claim 1 wherein said heat beam is a high-intensity focused beam and further including the step of moving said heat beam by plotter means over said particle bed.

7. The method of claim 4 wherein said vibrating means includes directing acoustical waves onto said particle bed.

8. A process for producing a three-dimensional shaped product comprising the steps of:

providing a container having a top, a bottom and sides;

providing a particle bed in said container made of a plurality of fusable particles, each particle in contact with its immediately adjacent particles in said particle bed, said particle bed having an upper layer of particles;

providing a base plate having a top that is vertically movable within said particle bed, said base plate positioned immediately below said upper layer of particles;

providing a heat beam;

directing said heat beam in a desired pattern onto said upper layer of particles above said base plate;

melting and fusing together those particles heated by said heat beam;

allowing said fused particles to solidify into a shape formed in said desired pattern;

lowering said base plate to a position under said upper layer of said particle bed;

covering said formed shape by further of said particles moving over said fused particles;

directing said heat beam in a desired pattern onto said particles covering said previously fused formed shape, said heat beam fusing certain of said particles together with one another and with said fused particles of said formed shape;

allowing said newly fused shape to solidify on top of said previously fused particles;

repeating said steps of lowering said base plate and causing further particles to cover said previously fused particles, directing said heat beam in a desired pattern, and allowing said fused particles to solidify as many times as necessary to complete the formation of said three-dimensional shaped product;

removing said three-dimensional shaped product from said particle bed;

providing an aperture defined in said bottom of said container; and lowering said three-dimensional shaped product out said aperture defined in said bottom of said container as it is being formed in said particle bed within said container to create a continuous-length, three-dimensional shaped product.

9. The method of claim 8 further including the step of heating said particles in said fluidized particle bed to a temperature lower than the melting point of said particles.

10. The method of claim 8 further including the step of:

maintaining the level of particles at a desired height within said container.

11. The method of claim 8 further including means to vibrate said particles within said container to aid in their movement over said three-dimensional object being formed.

12. The method of claim 8 wherein said heat beam is a laser and the step of directing said heat beam includes the steps of providing a moving mirror controlled by a computer and reflecting said laser beam onto said upper layer of particles.

13. The method of claim 8 wherein said heat beam is a high-intensity focused beam and further including the step of moving said heat beam by plotter means over said particle bed.

14. A process for producing a three-dimensional shaped product comprising the steps of:

providing a container having a top, a bottom and sides;

providing a particle bed in said container made of a plurality of fusable particles, each particle in contact with its immediately adjacent particles in said particle bed, said particle bed having an upper layer of particles;

providing a base plate having a top that is vertically movable within said particle bed, said base plate positioned immediately below said upper layer of particles;

providing a heat beam;

directing said heat beam in a desired pattern onto said upper layer of particles above said base plate;

melting and fusing together those particles heated by said heat beam;

allowing said fused particles to solidify into a shape formed in said desired pattern;

lowering said base plate to a position under said upper layer of said particle bed;

covering said formed shape by further of said particles moving over said fused particles;

directing said heat beam in a desired pattern onto said particles covering said previously fused formed shape, said heat beam fusing certain of said particles together with one another and with said fused particles of said formed shape;

allowing said newly fused shape to solidify on top of said previously fused particles;

repeating said steps of lowering said base plate and causing further particles to cover said previously fused particles, directing said heat beam in a desired pattern, and allowing said fused particles to solidify as many times as necessary to complete the formation of said three-dimensional shaped product;

removing said three-dimensional shaped product from said particle bed; and moving said base plate at a continuous speed.

15. The method of claim 14 further including the step of heating said particles in said fluidized particle bed to a temperature lower than the melting point of said particles.

16. The method of claim 14 further including the step of:

maintaining the level of particles at a desired height within said container.

17. The method of claim 14 further including means to vibrate said particles within said container to aid in their movement over said three-dimensional object being formed.

18. The method of claim 14 wherein said heat beam is a laser and the step of directing said heat beam includes the steps of providing a moving mirror controlled by a computer and reflecting said laser beam onto said upper layer of particles.

19. The method of claim 1 wherein said heat beam is a high-intensity focused beam and further including the step of moving said heat beam by plotter means over said particle bed.

* * * * *